(12) United States Patent
Aiuto et al.

(10) Patent No.: US 8,893,077 B1
(45) Date of Patent: Nov. 18, 2014

(54) SERVICE TO GENERATE API LIBRARIES FROM A DESCRIPTION

(75) Inventors: Anthony Julian Aiuto, Great Neck, NY (US); Mark Edward Stahl, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/436,620

(22) Filed: Mar. 30, 2012

Related U.S. Application Data (60) Provisional application No. 61/546,424, filed on Oct. 12, 2011.

(51) Int. Cl.
G06F 9/44 (2006.01)

(52) U.S. Cl.
USPC .......................................... 717/104; 717/106

(58) Field of Classification Search
None
See application file for complete search history.

(56) References Cited

U.S. PATENT DOCUMENTS

| | | | | |
|---|---|---|---|---|
| 6,167,568 A * | 12/2000 | Gandel et al. | | 717/176 |
| 6,604,110 B1 * | 8/2003 | Savage et al. | | 707/602 |
| 6,701,487 B1 * | 3/2004 | Ogami et al. | | 716/117 |
| 7,260,602 B2 * | 8/2007 | Osborne et al. | | 709/203 |
| 7,574,692 B2 * | 8/2009 | Herscu | | 717/116 |
| 7,644,414 B2 * | 1/2010 | Smith et al. | | 719/328 |
| 7,694,284 B2 * | 4/2010 | Berg et al. | | 717/137 |
| 7,865,878 B2 * | 1/2011 | Weiner et al. | | 717/122 |
| 7,992,139 B2 * | 8/2011 | Chitgupakar et al. | | 717/136 |
| 8,504,983 B1 * | 8/2013 | Englehart et al. | | 717/109 |
| 8,505,034 B2 * | 8/2013 | Jenkins et al. | | 719/316 |
| 8,510,762 B1 * | 8/2013 | Gregorio et al. | | 719/328 |
| 8,577,914 B2 * | 11/2013 | Hossain et al. | | 707/769 |
| 8,584,114 B2 * | 11/2013 | Rabinovich et al. | | 717/171 |
| 2002/0013862 A1 * | 1/2002 | Orchard et al. | | 709/315 |
| 2004/0015832 A1 * | 1/2004 | Stapp et al. | | 717/106 |
| 2004/0025148 A1 * | 2/2004 | Krueger | | 717/140 |
| 2004/0064806 A1 * | 4/2004 | Johnston-Watt et al. | | 717/124 |
| 2006/0143222 A1 * | 6/2006 | Daniel | | 707/102 |
| 2006/0173885 A1 * | 8/2006 | Moir et al. | | 707/101 |
| 2007/0027663 A1 * | 2/2007 | Cox | | 703/2 |
| 2007/0106778 A1 * | 5/2007 | Zeldin et al. | | 709/223 |
| 2007/0169017 A1 * | 7/2007 | Coward | | 717/136 |
| 2007/0271275 A1 * | 11/2007 | Fassette et al. | | 707/10 |

(Continued)

OTHER PUBLICATIONS

Snapfiles.com, located at http://www.snapfiles.com/, Captured on Oct. 11, 2011.*

(Continued)

*Primary Examiner* — Don Wong
*Assistant Examiner* — Hossain Morshed
(74) *Attorney, Agent, or Firm* — Birch, Stewart, Kolasch & Birch, LLP (57) ABSTRACT

A system and method provided as a Web service for on-demand generation of libraries, as well as working samples, for a specified API, target programming language and target platform. The system is accessed through an interface and includes a Web application, a data store, and a compile server. The Web application is configured to receive a request for code generation from the user interface, to retrieve a description of an API, determine if code artifacts have been previously generated for the API description, and generating a source library in a programming language and target platform of choice based on the API description. The data store stores generated code artifacts, and stores the generated source library for the API description. The compile server is configured to generate compiled libraries and documentation, and store compiled libraries and documentation in the data store.

11 Claims, 9 Drawing Sheets

(56) References Cited

U.S. PATENT DOCUMENTS

| | | | |
|---|---|---|---|
| 2008/0209451 A1* | 8/2008 | Michels et al. | 719/328 |
| 2008/0301666 A1* | 12/2008 | Gordon et al. | 717/172 |
| 2009/0007274 A1* | 1/2009 | Martinez et al. | 726/27 |
| 2009/0132070 A1* | 5/2009 | Ebrom et al. | 700/90 |
| 2009/0150423 A1* | 6/2009 | Spanton et al. | 707/102 |
| 2011/0029949 A1* | 2/2011 | Adams et al. | 717/109 |
| 2011/0030046 A1* | 2/2011 | Shemenski et al. | 726/9 |
| 2013/0031462 A1* | 1/2013 | Calvo et al. | 715/234 |
| 2013/0275359 A1* | 10/2013 | Sweeney et al. | 706/55 |

OTHER PUBLICATIONS

Programmable web, located at http://www.programmableweb.com, captured on Oct. 11, 2011.*

Programmable-web published at (httQ:!Iwww.Qrogrammableweb.com), captured on Oct. 11, 2011.*

Snapfiles.com, located at http://www.snapfiles.com, captured on Oct. 11, 2011.*

* cited by examiner

Parameters for a Library Request

- API name
- API version
- Language

Output from Code Generator – ZIP file

- Compiled generated library as a JAR file
- Source for generated library as a ZIP file
- Generic Java library (binary) as a JAR file
- JARs for generic libraries that are dependencies
- Example use case for the library (application name, developer key)

DIRECTORY    FIG. 6

| Tasks API | |
|---|---|
| v1 | |
| Documentation | About   Explore   Get Started |
| Libraries | Java   Python   C#   PHP   GWT |
| Blogger API | |
| v1 | |
| Documentation | About   Explore   Get Started |
| Libraries | Java   Python   C#   PHP |
| Prediction API | |
| v1.2 | |
| Documentation | About   Explore   Get Started |
| Libraries | Java   Python |
| V1.4 | |
| Documentation | About   Explore   Get Started |
| Libraries | Java   Python   C#   PHP |
| Moderator API | |
| v1 | |
| Documentation | About   Explore   Get Started |
| Libraries | Java   Python   C#   PHP |
| Analytics API | |
| V2.4 | |
| Documentation | About   Explore   Get Started |
| Libraries | Java   Python   C#   PHP   GWT |

FIG. 7

SERVICE TO GENERATE API LIBRARIES FROM A DESCRIPTION

This Non-provisional application claims the benefit of U.S. Provisional Application No. 61/546,424 filed on Oct. 12, 2011. The entire contents of the above application is hereby incorporated by reference and for which priority is claimed under 35 U.S.C. §119(e).

TECHNICAL FIELD

The inventive field relates to a service to generate API libraries from a machine readable API description.

BRIEF SUMMARY

This document describes a method for a Web service performed by one or more processors, the method. The method including receiving a predetermined list of API providers, selecting an API provider from the list of API providers, loading an API directory from the selected API provider, selecting an API from the API directory, loading an API description for the selected API, selecting a target programming language, generating a source library for the selected API, the target programming language, and a target platform based on the API description, and publishing the source library.

This document describes a method for a Web service performed by one or more processors. The method including loading an API description for an API, interpreting the API description and building a programming language agnostic model of the API, selecting a target programming language, generating an API library source in the selected programming language and a target platform based on the programming language agnostic model of the API, and publishing the API library source.

An aspect is a method wherein the predetermined list of API providers is received from a user.

An aspect is a method, further including extracting a location of an API description from information included in the API directory, and loading the API description based on the extracted location.

An aspect is a method, further including receiving a network location of an API description from a user, and loading the API description based on the received network location obtained from the user.

An aspect is a method wherein the generating a library includes interpreting the API description and building a programming language agnostic model of the API, and generating an API library source in the target programming language.

An aspect is a method wherein the loading an API description includes receiving an API description from a Web client.

An aspect is a method wherein the loading an API description loads an API description from a predetermined location in a network.

An aspect is a method wherein the publishing the library includes compiling the library source in the target programming language, and publishing the compiled library on a Web server.

An aspect is a method wherein the publishing the library source further includes generating documentation from the library source, bundling the generated documentation and compiled library into a compressed file format, and outputting the compressed file.

An aspect is a method wherein the publishing the library source further includes generating documentation from the library source, saving the generated documentation and compiled library into a format for use by a distributed program build system, and outputting the format for the distributed program build system.

An aspect is a method wherein the building a programming language agnostic model includes, creating an object for each of the elements in the API description, adding a pointer to each object's parent, assigning data types to the created object's properties and method parameters.

An aspect is a method wherein the generating an API source library includes, traversing the model from the root node toward the leaf nodes, selecting a template tree for the selected target programming language, perform template substitution while performing the traversing the model, and creating one or more output files per template.

An aspect is a method wherein while traversing the template tree, replacing object names for object names that are reserved words.

This document describes a Web service including one or more processors, a computer-readable medium coupled to the one or more processors having instructions stored thereon that, when executed by the one or more processors, cause the one or more processors to perform operations including receiving a list of API providers, selecting an API provider from the list of API providers, receiving an API directory from the selected API provider, selecting an API from the API directory, receiving an API description for the selected API, selecting a target programming language and a target platform, generating a source library for the selected API, the target programming language, and a target platform based on the API description, and publishing the source library.

This document describes a Web service including one or more processors, a computer-readable medium coupled to the one or more processors having instructions stored thereon that, when executed by the one or more processors, cause the one or more processors to perform operations including loading an API description for an API, interpreting the API description and building a programming language agnostic model of the API, selecting a target programming language, generating an API library source in the user selected programming language based on the programming language agnostic model of the API, and publishing the API library source.

An aspect is a Web service wherein the building a programming language agnostic model includes creating an object for each of the elements in the API description, adding a pointer to each object's parent, assigning data types to the created object's properties and method parameters.

An aspect is a Web service wherein the generating an API source library includes traversing the model from the root node toward the leaf nodes, selecting a template tree for the selected target programming language, perform template substitution while performing the traversing the model, and creating one or more output files per template.

An aspect is a Web service wherein while traversing the template tree, replacing object names for object names that are reserved words.

This document describes a computer-readable storage medium storing a computer program that, when executed by a computer performs steps of receiving a predetermined list of API providers, selecting an API provider from the list of API providers, loading an API directory from the selected API provider. selecting an API from the API directory, loading an API description for the selected API, selecting a target programming language, generating a source library for the selected API, the target programming language, and a target platform based on the API description, and publishing the source library.

This document describes a computer-readable storage medium storing a computer program that, when executed by a computer performs steps of loading an API description for an API, interpreting the API description and building a programming language agnostic model of the API, selecting a target programming language, generating an API library source in the selected programming language and a target platform based on the programming language agnostic model of the API, and publishing the API library source.

These and other aspects are described in detail with respect to the drawings. Other features, aspects, and advantages of the subject matter will become apparent from the description, the drawings, and the claims.

BRIEF DESCRIPTION OF THE DRAWINGS

The accompanying drawings constitute part of this specification. In the drawings.

DETAILED DESCRIPTION

Conventional approaches to code generation are performed on the specific target platform for a particular programming language. For example, generation of a code library can be performed from a WSDL description. Similar to Google Discovery, WSDL is a way to specify an API description. However, WSDL does not directly relate to an API library itself.

Instead, Microsoft provides a tool, named "WseWsdl3," that can be used to create a .NET library from a WSDL specification. Typically, a developer will install that tool on a Windows platform, take a WSDL specification and get source code for a .NET library.

Similarly, a developer using a Macintosh computer may use a tool for code generation for Objective-C. Currently, the process of generating libraries for alternative programming languages is a manual process that is both error prone and inconsistent.

Also, conventional approaches to generating source libraries for API's on target platforms does not scale well as the number of API's grows. In addition, different code generators on different platforms may produce inconsistent library sources for the same API. Different developers may produce library sources for the same API, leading to duplication of effort. As APIs change over time, developers may have client applications that are not compatible with the current API.

Subsequently, there is a need for a Web service that can provide API's on demand for any of a variety of programming languages and target platforms. Instead of generating and storing API libraries for every possible combination of programming language and target platform, generation of API libraries as needed reduces memory resources.

Disclosed embodiments solve these and other problems associated with scaling up library source generation for APIs.

This document describes embodiments that can automate the production of libraries to an API over existing methods, but producing them on demand from a web service. This eases the burden on the developer because they never have to install the code generation tool into their development environment. It also allows an API provider to amortize the cost of each developer generating the API library and associated reference documentation by producing it once in the cloud service (at the time of first request) and serving the same artifact to all future requestors. As an example scenario, a retailer can set up an API for doing business and deposit the API with a directory service for API's. A description of an API, for example an API Discovery Document, can be created for the API and deposited with the discovery service. Others can use the API in their own client application by requesting an API library source for the API from the Web service, for their particular programming language and target platform. The others wishing to use the API do not have to make the request form the target platform, and do not have to have a particular code generator installed locally on their computer.

There are several schemes for describing a service API in a descriptive language. For example, Google API Discovery, Web Application Description Language (WADL), and Web Services Descriptive Language (WSDL).

An aspect embodies code generation as a Web service, so that a developer can specify the location of the description of an API and a target programming language and receive a library for that API that is generated on demand.

Of particular value is that by making library generation demand-pull from the end user (a client application developer) it obviates the need for service providers to produce and publish language specific libraries for their describable APIs.

Service providers that provide API descriptions for the service may wish to control authentication over a particular user and application combination. An aspect of the present invention is the capability to specify authentication requirements for controlled access to the APIs.

To further enhance the benefit of supplying a generated library, an aspect is to generate working sample code for the generated library. Such working sample code can demonstrate a use of the API, and may even be sufficient for a developer to incorporate directly into a project.

Library Generation Service

A service is provided for creating and publishing API libraries from a machine readable API description. The inputs are an API description (e.g. an API Discovery Document obtained from the Google API Discovery service), a requested target programming language, and a target platform. The output can be a set of artifacts which provide an API library source specifically for that API in the target programming language. Target programming languages may include any high-level programming language such as Java, Python, C#, Objective-C, JavaScript, Dart, Google Web Toolkit, LISP, Fortran, C, and C++. Target platform refers to an operating system and associated hardware, and can include MacOS, Windows, Linux, Android, and iOS, and associated computer systems. One of ordinary skill in the art would understand that any number of combinations of programming language and target platform are possible.

There are several ways that the service can be embodied.

In an embodiment, an interface can be provided in which the user (who is typically a client application developer) can select a directory service from among known API providers and select from a list of APIs provided by the directory service. Known API providers include Google APIs, APIs of the U.S. National Weather Service, Programmable Web (www.programmableweb.com), Weatherbug (www.weatherbug.com), and Mashery.com, to name a few. The library generation service can read the directory of a selected API provider (e.g. located at www.googleapis.com) and present a list of APIs. Subsequently, (1a) the user can pick an API from the list;

(1b) the library generation service can use information from the directory service to download the API description;

(1 c) the library generation service can generate an API library source for the downloaded API description in the requested language;

(1d). the library generation service can publish that library source to the user.

Flexibility is enabled in that some of these steps can be performed directly by the user. For example, the user can provide the URL of an alternate API provider which provides an API directory. In this case the library generation service will use this alternate directory and proceed at step 1a. The user can provide the URL of an API description directly. In this case the process can proceed at step 1b. The user can provide a complete API description document which it uploads to the library generation service. In this case the process can proceed at step 1c. At step '1d', the generated library can be published several different ways. For example, any or all of the combination of library source, documentation generated from the source, a compiled binary object, and instructions for use can be provided. In a further embodiment, samples of using the library can be provided. Alternatively, a library source, documentation, compiled binary, and instructions can be bundled in a single download file for the user. Further, any one of the above components can be made available for easy reuse by others. Specifically, the documentation for generated libraries can be made available for Web browsing. The compiled binary objects can be made available in an online repository for an application build system (e.g., Maven).

API providers generally supply directories of APIs. A directory entry may show details about an API, including its name, a brief description of what it does, and a link to its documentation. Each API can have multiple directory entries, one for each of its supported versions.

Among schemes for describing APIs, the Google API Discovery Service provides Discovery Documents. A Discovery Document is a machine-readable description of a particular API. The Discovery Document describes the surface for a particular version of an API. The Document may provide details on how to access the various methods of each API via Representational State Transfer (REST) HTTP calls (for example, GET). A Discovery Document can include descriptions of the data and methods associated with the API, as well as information about authentication requirements or access rights, and descriptions of schemas, parameters and available parameter values.

A scheme for describing APIs, for example as in the case of a Discovery Document, can be in the form of a JSON (JavaScript Object Notation) format. JSON is a tree-like object format that points to nodes in a branch by named reference. JSON does not have an ability to directly point to nodes in another branch. Embodiments of the Web service can provide an API model that contains all of the elements of the Discovery Document, and may be augmented with explicit pointers to referenced elements as well as concepts that are common to programming languages, such as data type. The API model can be used in the generation of an API library source. An API library source is source code which exposes the functionality of an API. Other formats that can be used for the API specification may include XML, as well as any SGML document format, or other format that accommodates structured data.

Figure 1A:
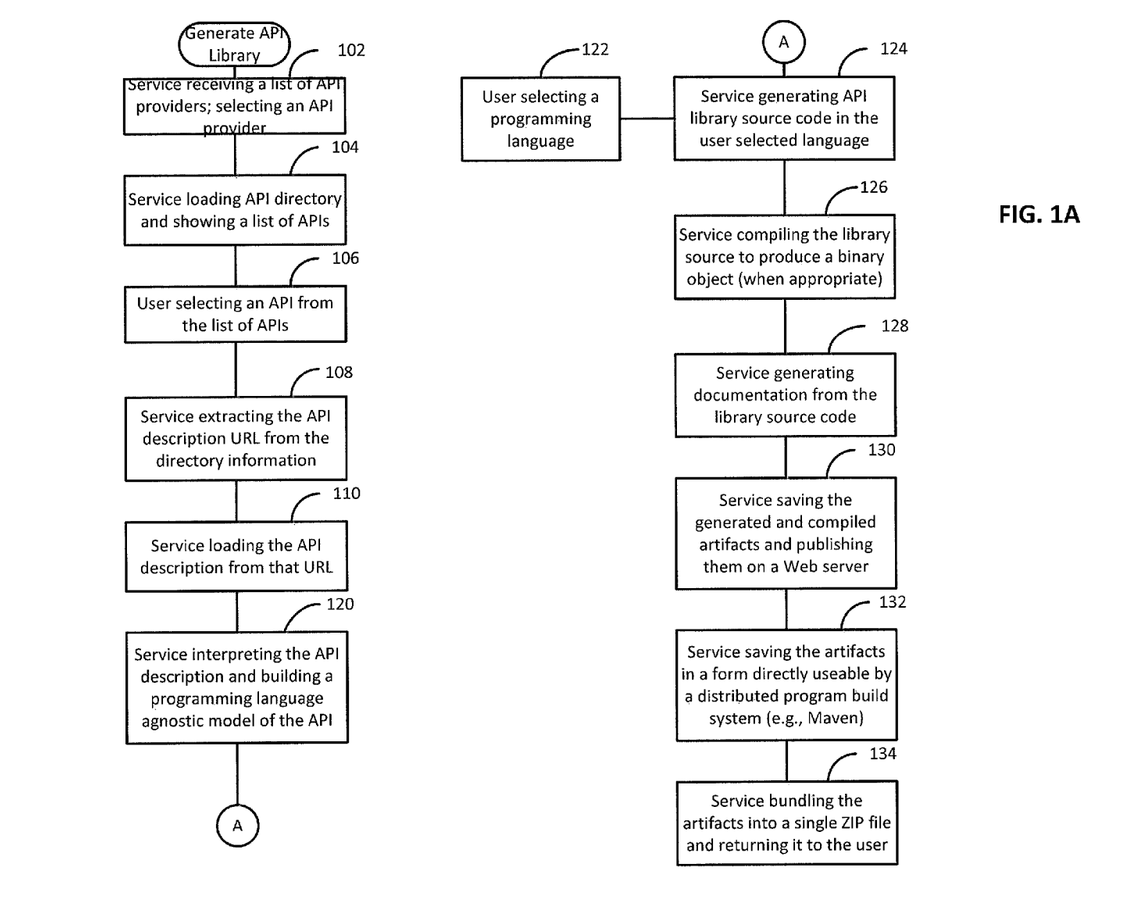
FIGS. 1A, 1B, 1C are a flow diagram for a library generation service.
Figure 6:
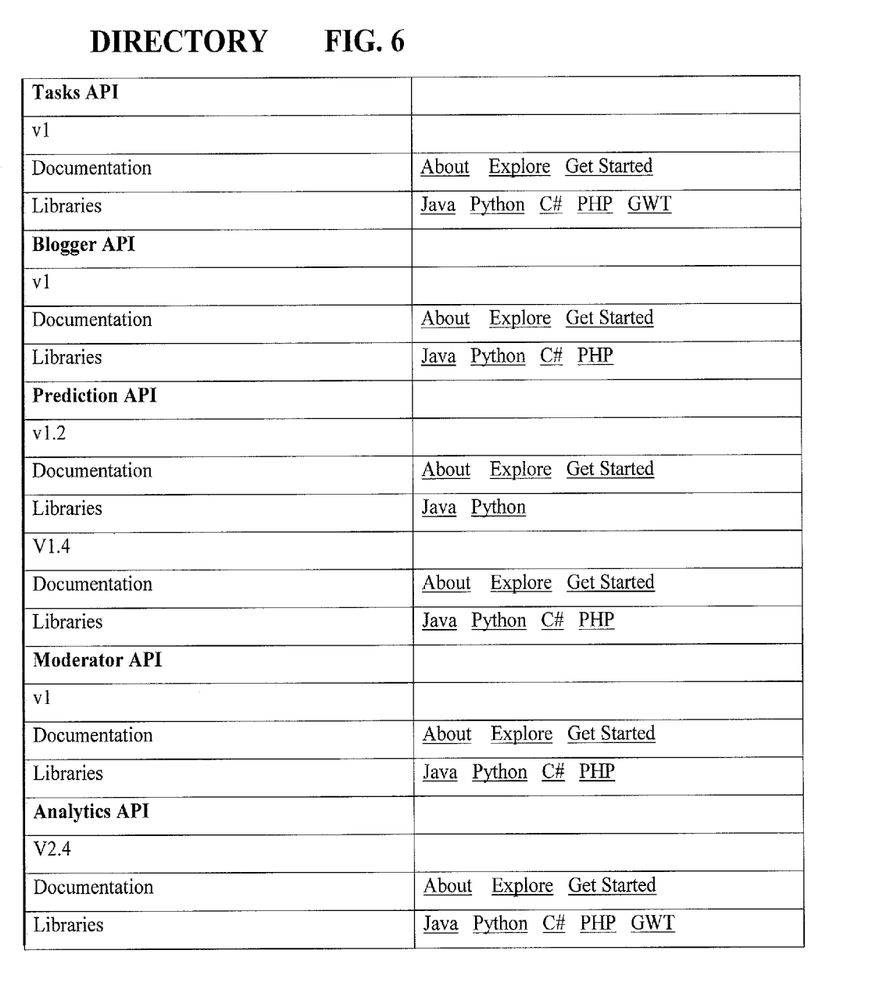
FIG. 6 is an example Directory.

An example process for an on-demand pull service for APIs is shown in FIG. 1A. At step 102, the user can select an API provider from a list of known API providers. At step 104, the service can send a query to a directory service of a selected API provider and using information in an API directory loaded from the directory service to show a list of APIs. An example of an API directory provided by a directory service is shown in FIG. 6. At step 106, the user can pick an API from the list of APIs. At step 108, the service can extract information from the directory, that can include an API description URL. At step 110, the service can load an API description document based on the URL of the document provided in the API description. Using the API Discovery Service, for example, a Discovery Document is fetched for a selected API.

At step 120, the service can interpret the API description document and build a programming language agnostic model of the API. At 122, the user can select a target programming language. At step 124, the service can generate an API library source code in the user selected programming language. At step 126, upon receiving a compile command, the service can compile the library source to produce a binary object. At step 128, the service can generate documentation from the library source code.

At step 130, the service can_save the generated and compiled artifacts and publish them on a Web server. At step 132, the service can_save the artifacts in a layout suitable for a repository in a form directly usable by a distributed program build system (e.g., Maven). At step 134, the service can bundle the artifacts into a compressed format, such as a single ZIP file, and return the compressed format to the user.

The library generation service provides flexibility by allowing a user to enter the process at the publishing step. The user can present the service with a URL that specifies "documentation for the Java library for API X" and the service can generate the library and provide the documentation if it does not already exist.

An example API is Tasks, which can enable a client application to manage tasks and task lists. The API Discovery Service can provide a Discovery Document for the Tasks API. A Discovery Document may describe access to the API using, for example, Representational State Transfer (REST). A Discovery Document is typically organized in JSON. In JSON, objects in brace contain key-value pairs. Subsequently, the Discovery Document for Tasks API may begin with:

----------------------------------------------------

{
"kind": "discovery#restDescription",
"id": "tasks:v1",
"name": "tasks",
"version": "v1",
"title": "Tasks API",
"description": "Lets you manage your tasks and task lists.",
"icons": {
"xx1": "http://www. . . . /xx1.png",
"xx2": "http://www. . . . /xx2.png"
. . .

----------------------------------------------------

The Discovery Document may include a value for a link to documentation for the API, such as:

. . .

"documentationLink": "http://code . . . /apis/tasks/v1/using.html",

----------------------------------------------------

The Discovery Document may identify a value for an access protocol and Universal Resource Locator (URL) information, that identifies the location of the API, such as:
"protocol": "rest",
"baseUrl": "https://www.googleapis.com/tasks/v1/",
"basePath": "/tasks/v1/",
-----------------------------------------------------

The Discovery Document can include interrelated objects that are particular to the API. Objects may include "parameters," "authorization," "schemas," "TaskList," "resources," etc. The objects may contain particular objects, such as a schema for "Tasks." The "resources" object may define "methods." "Methods," may contain one or more parameters. For example, there may be a schema for Tasks, and a resources object for Tasks that defines methods associated with Tasks. An example method is "list", for example, as follows:
"schemas": {
. . .
"Tasks": {
"id": "Tasks",
"type": "object",
"properties": {
. . .
}
},
"resources": {
"tasklists":
"methods": {
. . .
},
"tasks": {
"methods": {
. . .
. . .
"list": {
"id": "tasks.tasks.list",
"path": "lists/{tasklist}/tasks",
"httpMethod": "GET",
"description": "Returns all tasks in the specified task list.",
"parameters": {
"completedMax": {
"type": "string",
"description": "Upper bound for a task's completion date . . .",
"location": "query"
},
"completedMin":
. . .
},
}
. . .
-----------------------------------------------------

Figure 7:
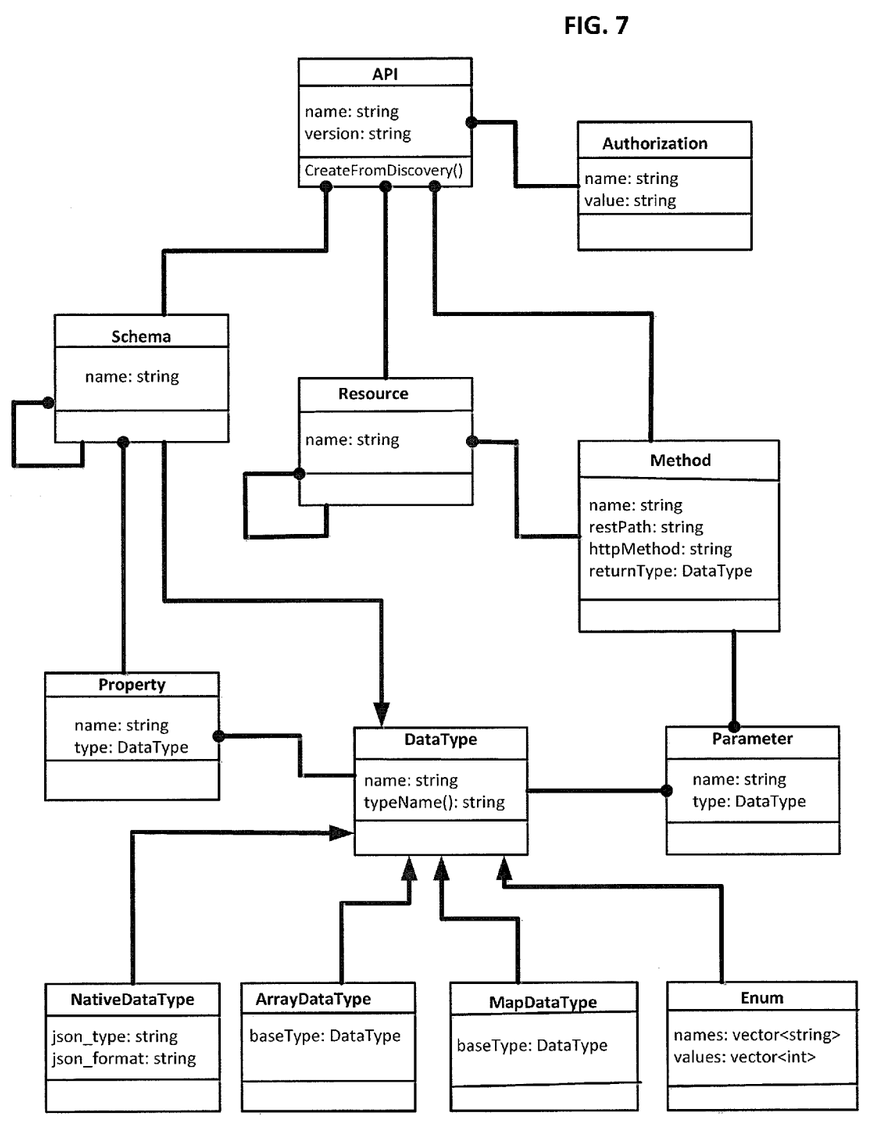
FIG. 7 is an example API model.

The library generator can use the description provided in, for example, a Discovery Document to produce an API model, and to generate a client library for the API. FIG. 7 shows an example of an API model.

The API model is a representation of, for example, the Discovery Document augmented with affordances for generating source code in various programming languages. A library is a concrete set of source language files in a specific programming language which provides a client side API to the remote API defined by the Discovery Document. The API model is the vehicle which makes it easier to construct templates for libraries in specific languages.

Figure 1B:
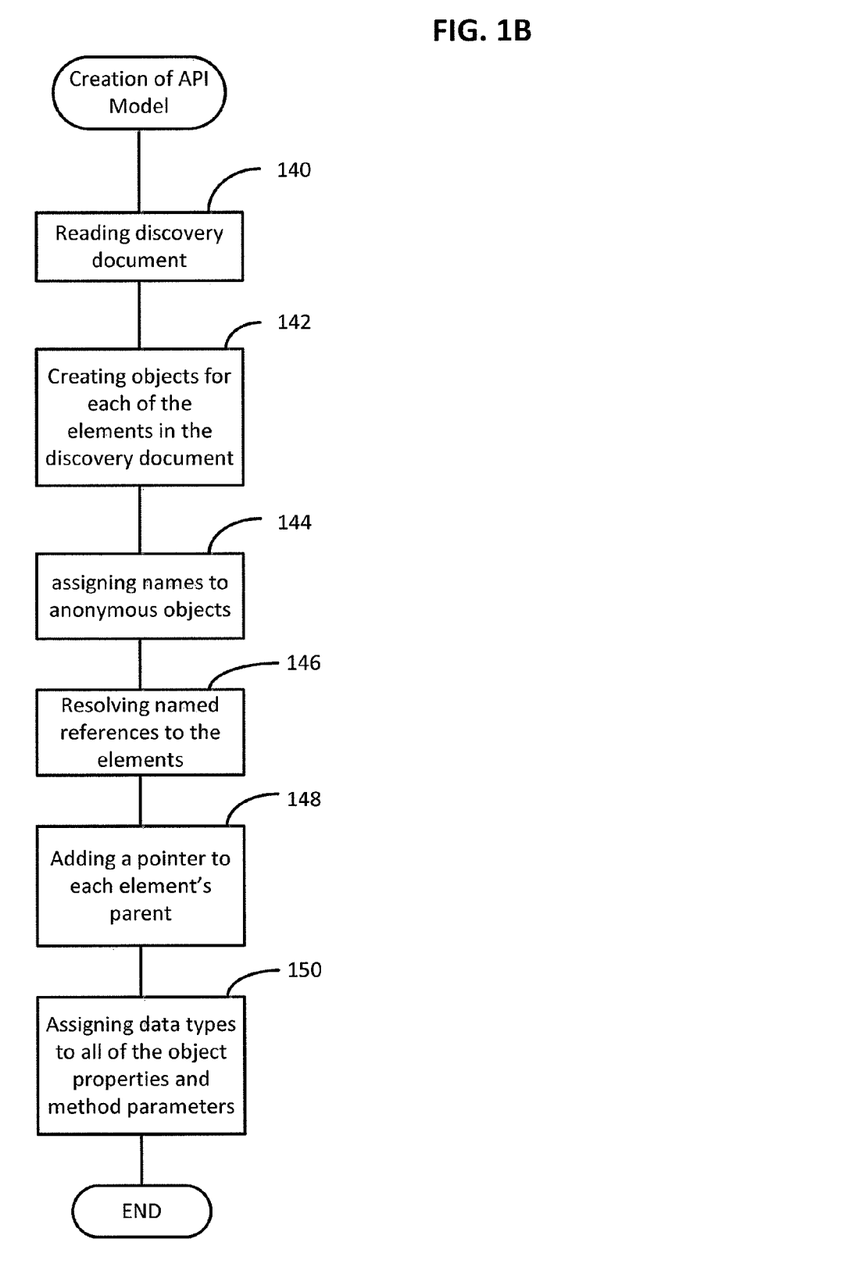

FIG. 1B shows step 120, of building a programming language agnostic model of the API, in greater detail. The library generator, at step 140, can read the Discovery Document. At step 142, the library generator can create objects for each of the elements in the Discovery Document. Each element of the Discovery Document is represented by one or more objects in the API model. All of the attributes from the JSON structure of each element can be maintained in memory for later use. The objects_have uniform names for concepts like the object identity. In the API_Discovery Service, an object might be named by it's "id" or have a name implied by a label to a structure. In the API model, all elements are assigned an "id", regardless of how it is derived. In step 144, the library generator can assign names to anonymous (unnamed) objects. At step 146, the library generator can resolve named references to the elements to explicit pointers. At step 148, the library generator can add a pointer to each element's parent; in particular, the object which would own its definition in a typical programming language. At step 150, the library generator can assign data types to all of the object properties and method parameters. Sometimes this means creating and interposing elements that are not present directly in the API Discovery Service. For example, an entity might have a type description which says array<object<int, string, string>>. The API model would contain an anonymous object type of object<int, string, string> with its own name X (assigned in step 3), and then create a data type which represents array<X>.

Figure 1C:
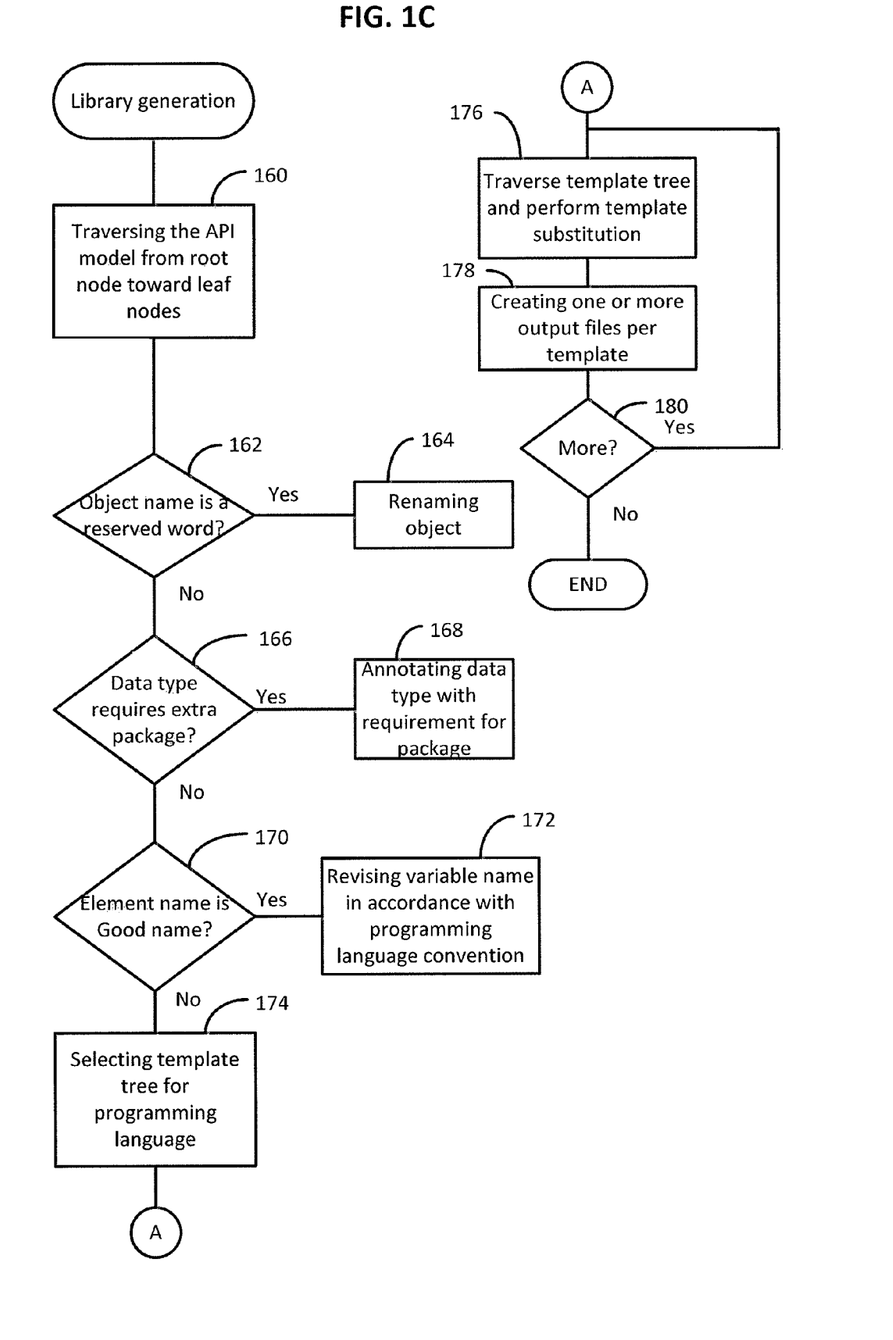

FIG. 1C shows step 124, of generating an API library source code, in more detail. At step 160, the library generator can traverse the tree of objects, from API root node down (as shown in the API model of FIG. 7) and adjust for a language's specific needs. At step 162, a decision is made to determine_if an object name is a reserved word in a specific language, and at step 164, the library generator renames the object. At step 166, a decision is made to determine if a data type used by the model requires an extra package not in the standard language, and at step 168, the library generator can annotate the data type to require the package. As necessary according to step 170, the library generator determines if an element name is "good," and at step 172, can create "good" names in accordance with programming language convention. For example, "max-results" might appear as a parameter name in an API, but no programming language allows the string "max-results" as a variable name. For idiomatic Java the library generator would use the name "maxResults". For idiomatic C++ library generator would use the name "max_results".

At step 174, the library generator can select a template tree for the given programming language. A template tree is a tree of files, such as a directory structure. The code generator has the ability to support multiple variations of a given programming language, for example the 'stable' and experimental versions. At step 176, the library generator can traverse the template tree to run a template substitution process, and at step 178 the library generator can create one or more output files per template. At step 180, the library generator checks for more templates. Some templates have special names which indicate they must be applied multiple times. For example, a template named "_schemas.tmpl" would be invoked once for each Schema element in the API model. In this example, the emitted library source would contain an output file for each invocation, named respectively by the Schema id's.

The template substitution process can reference all of the original JSON elements, plus the model and language's specific additions. A template substitution process for an API library can contain a loop over all the resources in the API, creating programming languages methods for each Method object, then recursively calling this procedure for any sub-resources.

The template process may also contain an ability to combine the elements from the API model and the specific programming language to generate code. Specifically, most languages require that the data type of all variables be specified. In an embodiment, this concept of a programming language correct data type is represented as the "codeType". When a template calls for the "codeType" of an object in the API model, the generator pulls together the object's DataType and the language being generated to find a method (generator method, not API method) which will emit the language specific data type. For example, an object in the model might have a DataType representing Array<X>. When the generator is generating Java code and a template calls for the "codeType" of that object, the generator can call a method with the parameters "java" and the object. That method can select the Java language syntax for arrays, and return the string "java.util.List<X>".

Working Sample Code Generation Service

Generating API libraries on-demand can alleviate the need to create API libraries in advance for various combinations of programming languages and target platforms. An embodiment can generate sample code for a generated library in order to assist in understanding how to use the API. In addition, some level of authentication of a user and an API may be necessary in particular applications. In particular, an embodiment can include a service provided for generating sample working code for an API library. However, client library working samples need to be kept up to date with changes in an API. As API's change, creating working samples and keeping working samples up to date becomes more complicated as the number of APIs grow and as APIs change frequently. Accordingly, the API code generation service provides a tool that can create working samples for accessing the API using a generated client library. The service can build the sample code based on a machine readable description of the API.

Generation of libraries, working samples and documentation can be done by the Code Generation service. The Code Generation service provides a mechanism to generate libraries, working code samples, documentation, and binary artifacts for APIs that have been described in a formal manner, such as the Google Discovery Document. The Code Generation service can also serve as a primary distribution point for APIs and libraries for the APIs. The Code Generation service can further provide an infrastructure on which parties can build sophisticated IDE plugins for other environments; e.g. Xcode and Visual Studio.

Figure 2:
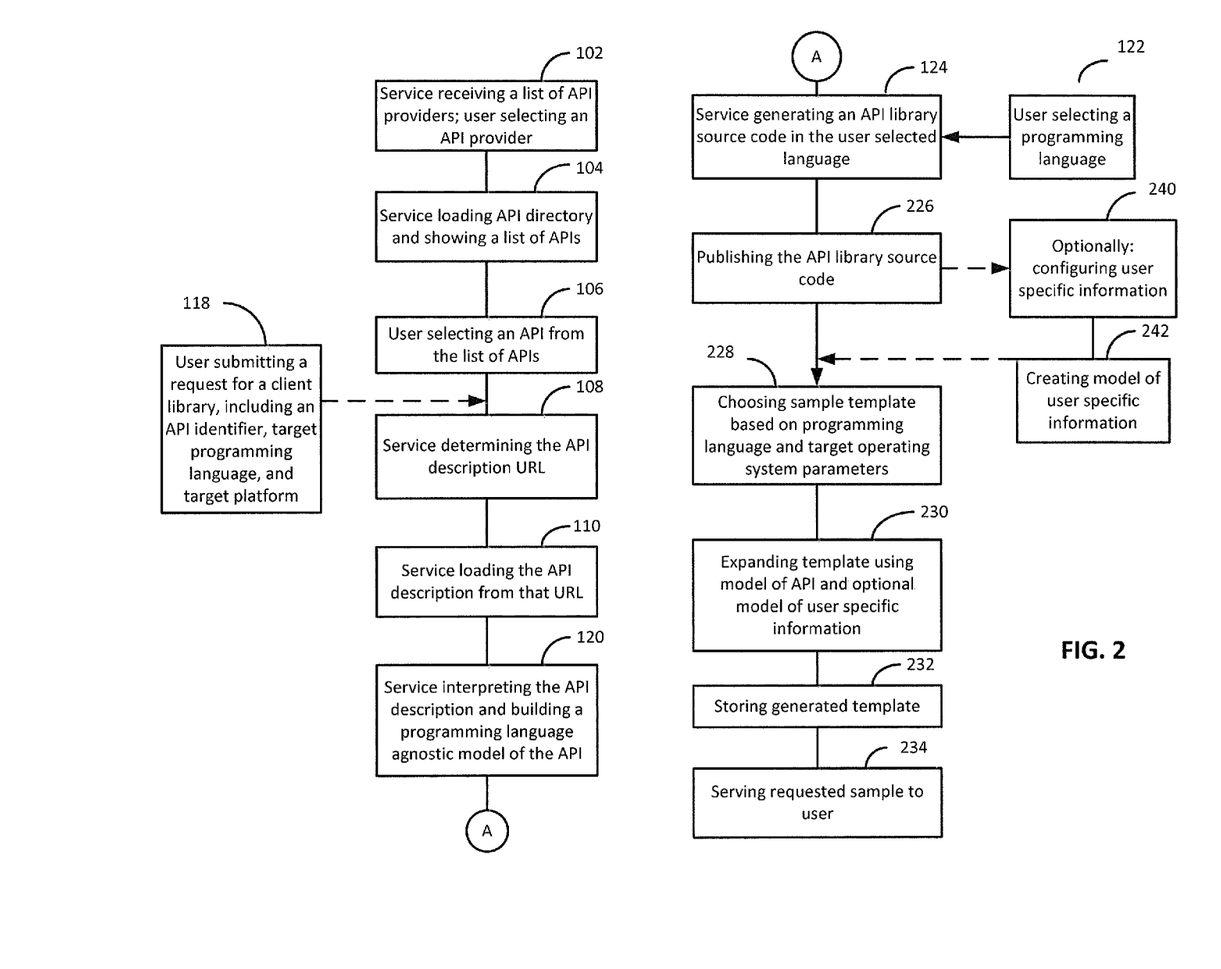
FIG. 2 is a flow diagram for a custom client working sample generation service.

FIG. 2 is a flowchart for a process of generating working samples in association with a library for an API. Steps 102 to 124 are the steps shown in FIG. 1A for generating a library source, and have already been described above. In generating a library source, at step 118, a request for a client library can include an identifier of an API, a target programming language, and a target operating system platform. As in steps 126 to 134 in FIG. 1A, in step 226 the API library can be published.

The process of generating working samples can include creating an authentication model. At step 240, authentication information, such as authentication credentials that are specific to the user and the API can be configured. At step 242, a model of the authentication information can be created, where a model is for a specific programming language and operating system platform.

At step 228, a sample template can be chosen based on the programming language and target operating system parameters. The sample template is a generic sample application for a programming language and platform in which key parts of the template are blocked out, to be replaced with API specific code. Once completed with API specific code, the generic sample application both can show how the API can be utilized and itself can be used as a client application for execution in the target platform.

For example, a line of code in a sample template may contain sections that are to be completed with information related to an API, such as:
service=build('{{api.name}}', '{{api.version}}', http=http)

In the generation of a working sample for an API, blank sections may be completed based on information in a model of an API to create an expanded sample template, such as:
service=build('books', 'v1', http=http)

At step 230, the sample template can be expanded using information extracted from the model of the API, as well as a model of user specific information, as requested. At step 234, the expanded sample template corresponding to the requested API, target programming language, and target operating system platform can be served to the user. Alternatively, at step 232, the sample templates are stored at a unique Web location to be downloaded as needed. The expanded sample template may be executed on the target platform.

In alternative embodiments, the creation of the working samples may be done all at once when the discovery document is first read, or the creation may be 'lazy', that is, working samples are created just in time as they are needed. Also, the Discovery Document can be retrieved over the Internet or stored locally with the generating service. Further, a working sample can be a sample that accesses one or more APIs. Still further, a working sample may be generated for public consumption, or may be generated for a narrow audience and have a limited distribution.

Code Generation Service

Figure 3:
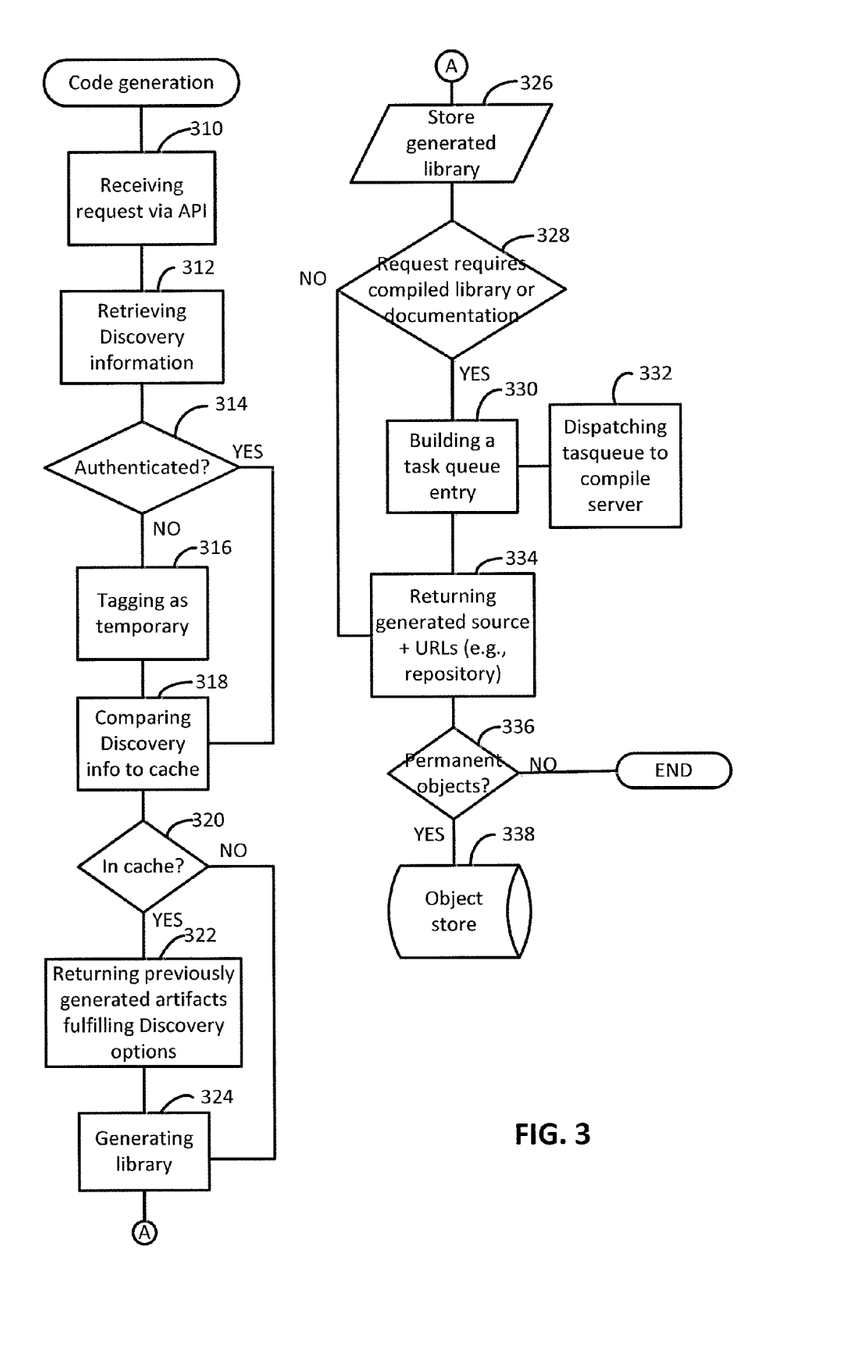
FIG. 3 is a block diagram for a working sample generation service.
Figure 4:
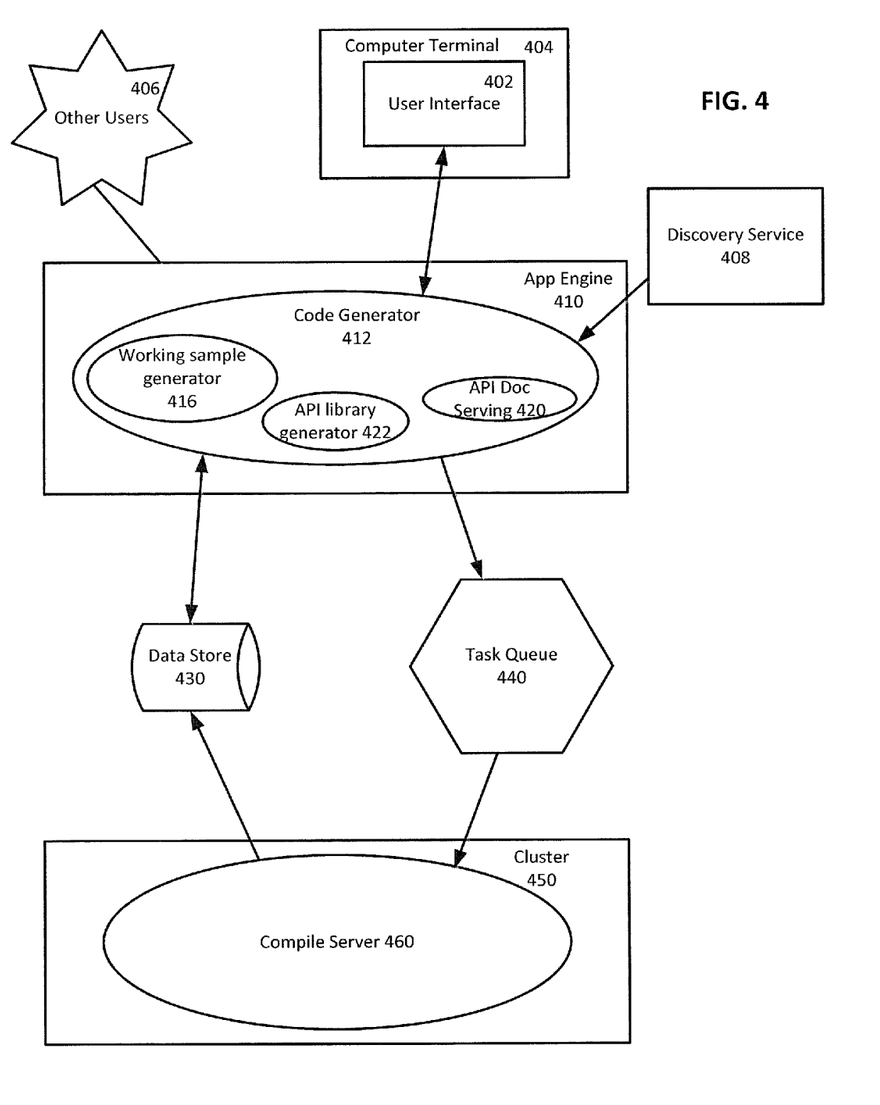
FIG. 4 is a block diagram for an example computer implementation for the generation services.

An example system for performing a code generation service is shown in FIG. 4. An operation of the code generation service is shown in FIG. 3. It is understood that the system may be implemented in a stand-alone environment or may be a parallel and distributed computer system. The example system may include a computer terminal 404 that is in communication with an application hosting service, such as App Engine 410. The hosting service can store and retrieve data in data store 430, which can obtain compiled code from compile server 460. Code to be processed by the compiler server 460 can be temporarily maintained in a task queue 440. It is understood that hosting service, data store 430, and compile server 460 can be made up of any number of processors. In the example system, the compiler server 460 is in a cluster of computers 450. Also, the code generator 412 can include a working sample generator 416 for creating sample applications from templates, API library generator 422 that generates an API library from an API description, and API Document Serving component 420.

The basic flow through a typical request is:

Step 310, a request from an interface 402, such as a Web user interface, can be received via an API, and can contain credentials that authenticate the user as having access rights to specific API's.

Step 312, Code generator 412 can retrieve discovery information from Discovery service 408, which may be both with the user's authentication credentials and without them.

Step 314, if the information is not available unauthenticated, then, step 316, the information can be tagged as temporary.

Step 318, the discovery information can be compared against information about previously generated artifacts in a cache (for example, a section of the data store 430). At step 320, if there is a match ('YES'), at step 322, previously generated artifacts fulfilling the requested parameters can be returned.

Step 324, the library can be generated_using library generator 422 and saved in a data store 430.

Step 328, If the request requires a compiled library or documentation, step 330, a task queue entry 440 can be built and may include a compile command and step 332, the compile command can be dispatched to the compile server 460 to complete.

Step 334, the generated source, along with URLs to poll for availability of the compiled libraries in data store 430 can be returned. For libraries tagged as temporary, a short lived storage key can be used. For others a permanent key can be used.

Step, 336, For permanent objects, step 338, generated documentation files can be placed_in Data Store 430 for future serving to users by way of the API Doc Serving component 420.

Web User Interface

The library generation service can be provided with a Web user interface. Developers that interact with the Web user interface may require authentication. The Web user interface can provide an authentication input.

Alternatively, an XML and JSON interface can be provided so that a tool, such as Eclipse, can use the library generation service directly. Eclipse is an interactive software development environment.

Figure 5:
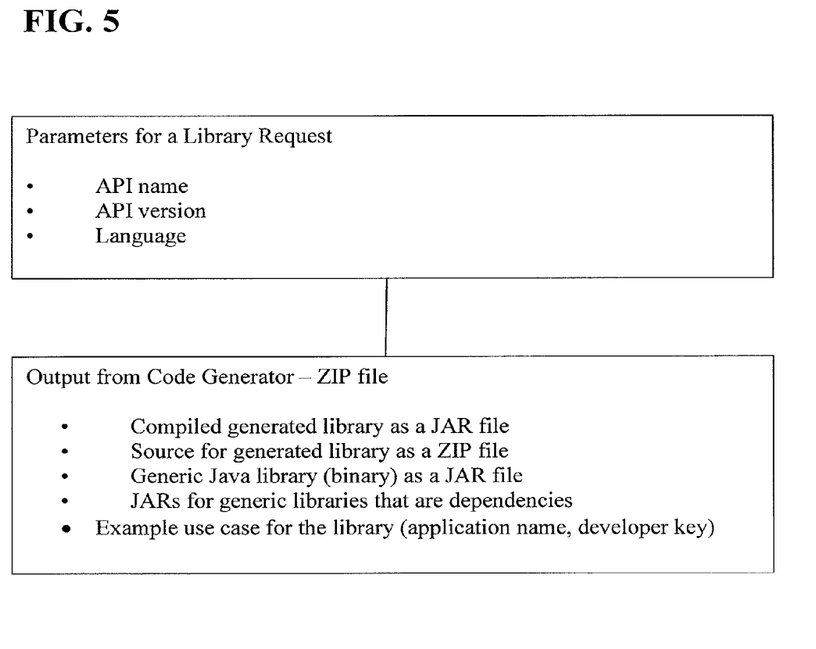
FIG. 5 is an example of input parameters and output parameters for the library generation service.

As can be seen in FIG. 5, the library generation service takes as inputs, parameters including API name, API version, and programming language. These parameters can be provided by way of the Web user interface, and sent in a HTTP message.

The library generation service returns a ZIP file containing one or more of the following (as applicable for the choice of programming language), the source for the generated library, the compiled generated library in binary format, the reference documentation for the generated library, other source or binary libraries that the generated library depends on, and an example use case for the library, provided as a separate source file.

The Web user interface to the library generation service helps get API developers up and running as quickly as possible. The typical developer has to clear some hurdles, such as Authentication, downloading core libraries, and API specific libraries, before they can get code up and running talking to resident APIs. The Web user interface clears those hurdles by having a single page where developers can answer some simple questions and download a fully functional sample for the API, programming language, and platform of their choice. The Web user interface allows selecting target APIs, programming languages and target platforms to be submitted in order to generate samples, documentation and libraries. The Web user interface can be a standalone page or can be embeddable as a JS widget.

The Web user interface can provide developers with on-demand working samples to help them get started in their specific development environment. Developers can choose a combination of API, language, deployment environment, and (sometimes) development environment and the service provides them with a block of code they can directly execute to get them started. In the case of on-demand working samples, it is not necessary for the library generation service to write samples for all possible combinations. Instead, the library generation service can use the Code Generation infrastructure to generate samples through templates that are managed by the service.

Computer Implementation for Clients and Servers

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a Web service performed by one or more processors, the method comprising:
    loading an API description for an API;
    interpreting the API description and building a programming language agnostic model of the API;
    selecting a target programming language;
    generating an API library source in the selected programming language and a target platform based on the programming language agnostic model of the API; and
    publishing the API library source.

2. The method of claim 1, wherein the loading an API description includes receiving an API description from a Web client.

3. The method of claim 1, wherein the loading an API description loads an API description from a predetermined location in a network.

4. The method of claim 1, wherein said building a programming language agnostic model includes:
    creating an object for each of the elements in the API description;
    adding a pointer to each object's parent;
    assigning data types to the created object's properties and method parameters.

5. The method of claim 4, wherein said generating an API source library includes:
    traversing the model from the root node toward the leaf nodes;
    selecting a template tree for the selected target programming language;
    perform template substitution while performing said traversing the model; and
    creating one or more output files per template.

6. The method of claim 5, wherein while traversing the template tree, replacing object names for object names that are reserved words.

7. A Web service comprising:
    one or more processors;
    a computer-readable medium coupled to the one or more processors having instructions stored thereon that, when executed by the one or more processors, cause the one or more processors to perform operations comprising:
    loading an API description for an API;
    interpreting the API description and building a programming language agnostic model of the API;
    selecting a target programming language;
    generating an API library source in the user selected programming language based on the programming language agnostic model of the API; and
    publishing the API library source.

8. The Web service of claim 7, wherein said building a programming language agnostic model includes:
    creating an object for each of the elements in the API description;
    adding a pointer to each object's parent;
    assigning data types to the created object's properties and method parameters.

9. The Web service of claim 7, wherein said generating an API source library includes:
    traversing the model from the root node toward the leaf nodes;
    selecting a template tree for the selected target programming language;
    perform template substitution while performing said traversing the model; and
    creating one or more output files per template.

10. The Web service of claim 9, wherein while traversing the template tree, replacing object names for object names that are reserved words.

11. A non-transitory computer-readable storage medium storing a computer program that, when executed by a computer performs steps of:
    loading an API description for an API;
    interpreting the API description and building a programming language agnostic model of the API;
    selecting a target programming language;
    generating an API library source in the selected programming language and a target platform based on the programming language agnostic model of the API; and
    publishing the API library source.

* * * * *